United States Patent [19]

McCartney

[11] 4,158,476
[45] Jun. 19, 1979

[54] SINGLE OPTICAL FIBER CONNECTOR

[75] Inventor: Ronald L. McCartney, Orange, Calif.

[73] Assignee: International Telephone and Telegraph Corporation, New York, N.Y.

[21] Appl. No.: 861,110

[22] Filed: Dec. 16, 1977

[51] Int. Cl.² ............................................... G02B 5/14
[52] U.S. Cl. ................................................. 350/96.21
[58] Field of Search ........................... 350/96.20, 96.21

[56] References Cited

U.S. PATENT DOCUMENTS

| 4,050,783 | 9/1977 | Tardy | 350/96.21 |
| 4,087,155 | 5/1978 | Deacon | 350/96.21 |

FOREIGN PATENT DOCUMENTS 2602662  7/1977  Fed. Rep. of Germany ........ 350/96.21

Primary Examiner—Rolf G. Hille
Attorney, Agent, or Firm—Thomas L. Peterson

[57] ABSTRACT

A connector for coupling a pair of single optical fibers is disclosed. Each contact of the connector utilizes three spheres of equal diameter defining a tricuspid interstitial space therebetween into which the end of a fiber is mounted. The spheres are embraced by a circular race and may engage each other but always engage the race. When a pair of contacts is mated in axial abutting relationship, the spheres in the mating abutting contacts nest with respect to each other, thereby precisely laterally aligning the optical fibers which are mounted in the interstitial spaces of the sets of spheres in the two contacts. Spring means are included to urge the spheres inwardly and are releasable to facilitate insertion of a single optical fiber extending axially and to compensate for alignment tolerances.

12 Claims, 3 Drawing Figures

SINGLE OPTICAL FIBER CONNECTOR

The United States Government has rights in this invention pursuant to Contract No. DAAB07-76-C-1357 awarded by the Department of the Army.

BACKGROUND OF THE INVENTION

The present invention relates generally to a connector and, more specifically, to an optical coupler for single optical fibers.

The employment of fiber optic cables or light guides, also sometimes referred to as optical communication fibers for the transmission of information-bearing light signals, is now an established art. Much development work has been devoted to the provision of practical low-loss glass materials and production techniques for producing glass fiber cables with protective outer claddings or jackets. The jackets make them resemble ordinary metallic-core electrical cable upon superficial external inspection. Obviously, if fiber optic cables are to be used in practical signal transmission and processing systems, practical connectors for their selective engagement and disengagement must be provided.

A reference for background in the state of the fiber optic art in general is an article entitled "Fiber Optics", by Narinder S. Kapany, published in *Scientific American*, Vol. 203, pages 72–81, November 1960. That article provides a useful background in respect to some theoretical and practical aspects of fiber optic transmission.

Of considerable relevance to the problem of developing practical fiber optic connectors is the question of transfer efficiency at the connector. Various factors, including separation at the point of abutment and lateral separation or axial misalignment, are among the factors effecting the light transfer efficiency at a connector. In this connection, attention is directed to the Bell System Technical Journal, Vol. 50, No. 10, December 1971, specifically to an article by D. L. Bisbee, entitled, "Measurement of Loss Due to Offset and End Separations of Optical Fibers". Another Bell System Technical Journal article of interest appeared in Vol 52, No. 8, October 1973, and was entitled, "Effect of Misalignments on Coupling Efficiency on Single-Mode Optical Fiber Butt Joints", by J. S. Cook, W. L. Mammel and R. J. Grow.

Fiber optic bundles are normally utilized for only short transmission distances in fiber optic communications networks. On the other hand, fibers are used individually as optical data channels to allow transmission over many kilometers. At present, most fiber optic cables are multi-fiber bundles due to the less stringent splicing requirements, greater inherent redundancy, and higher signal-to-noise ratio. The difficulty in achieving connection between single fibers which are relatively insensitive to axial misalignment problems but relatively sensitive to lateral misalignment has created an obstacle to the use of long-run single data transmission systems.

In accordance with the foregoing, a connector or coupler is required to essentially eliminate lateral tolerances if low-loss connections are to be obtained in the use of single fiber optical transmission arrangements. In the prior art, "V" groove and metal sleeve arrangements have been used to interconnect single fibers. Reference is made to U.S. Pat. No. 3,768,146 which discloses a metal sleeve interconnection for single fibers.

Another known device, as shown in U.S. Pat. No. 3,734,594, utilizes a deformable annular core having pressure plates at the ends. The fiber ends are inserted into the core and an axial force is applied to the plates to deform the core radially, thereby aligning and securing the fibers.

These prior devices, however, do not readily provide sufficient accuracy for joining and aligning optical fiber cores of small diameter.

Copending application of Charles K. Kao, entitled, "Precision Optical Fiber Connector", Ser. No. 613,390, filed Sept. 15, 1975 (now U.S. Pat. No. 4,047,796), assigned to the assignee of the present application, discloses a single optical fiber connector in which the ends of mating fibers are precisely aligned and coupled together in the interstice between three like-contacting cylindrical rods. The rods are mounted along and around the fibers within an adjustable connector assembly. Means is provided for expanding the interstice to insert the fiber ends and for clamping the rods in position around the fibers. Copending application of Charles K. Kao entitled, "Precision Surface Optical Fiber", Ser. No. 629,210 filed Nov. 5, 1975, assigned to the assignee of the present application, discloses an optical fiber in which the plastic cladding thereof is formed with three rounded indentations along its surface and a thin metal ferrule is formed around the classing at the mating end of the fiber. A pair of such fibers may be aligned in a three-rod arrangement of the type mentioned above.

A hermaphroditic connector for coupling a pair of single optical fibers is disclosed in the copending U.S. Patent application of Ronald L. McCartney entitled, "Single Optical Fiber Connector", Ser. No. 629,004, filed Nov. 5, 1975, abandoned in favor of Ser. No. 682,274 filed May 3, 1976, now U.S. Pat. No. 4,088,390 also assigned to the assignee of the present application. The connector comprises a pair of connector members each containing at least one single optical fiber terminated by a termination pin. The pin includes a metal eyelet crimped about the optical fiber in three places providing three, spaced, curved indentations which centrally position the fiber in the pin. When the connector members are mated, the mating termination pins are positioned so that the indentations therein are generally aligned. Three arcuate cam or spring members are forced into the indentations in the mating termination pins to accurately laterally align the pins and, thence, the optical fibers therein.

In copending application of Ronald L. McCartney entitled, "Single Optical Fiber Connector", Ser. No. 680,171, filed Apr. 26, 1976 (same assignee as above), there is disclosed a single optical fiber connector comprising a base plate having a V-groove in its upper surface which has the transverse cross-section of an equilateral triangle. Two sets of three equal diameter cylindrical rods lie in the groove, each defining an interstitial space therebetween which receives an optical fiber. The sets of rods have mating end faces which abut each other in the groove. A compression plate is mounted over the base plate to arrange the rods in the V-groove so that the centers of the rods are disposed at the vertices of the same equilateral triangle whereby the fibers in the interstitial spaces between the rods become precisely laterally aligned. Such a connector arrangement is particularly suited for a flat cable having single optical fibers.

In copending application of R. L. McCartney et al, entitled, "Single Optical Fiber Connector Utilizing Elastomeric Alignment Device", Ser. No. 680,170, filed Apr. 26, 1976, now abandoned (same assignee), there is disclosed a single optical fiber connector which incorporates a deformable elastomeric alignment element having a bore therethrough. A pair of contacts are mounted lengthwise in the bore. The contacts embody like sets of three equal diameter cylindrical rods. Preferably, the rods are formed of plastic and are integral with a plastic body of the contact. The adjacent cylindrical surfaces of the rods of each contact provide a tricuspid interstitial space for receiving an optical fiber. The sets of rods of the contacts have mating end faces which abut each other when the contacts are pushed into the opposite ends of the bore in the alignment element. The relative dimensions of the two sets of rods and the bore in the elastomeric alignment element are selected so that the region of the element surrounding the mating end faces of the rods is strained to exert a radially inwardly directed compressive force urging the rods of each set inwardly. Such inward compression of the rods causes the adjacent cylindrical surfaces thereof to engage each other and the fiber disposed therebetween so that the centers of the three rods of each contact are disposed at the vertices of an equilateral triangle, whereby the fibers in the contacts become precisely laterally aligned. Such coupling arrangement is suited for axially mated connectors.

The three-rod contact alignment approach discussed hereinabove has been found to suffer some problems. Normally, the optical fiber mounted in the interstitial space defined by the three rods of the contact is recessed slightly behind the mating end faces of the rods so that when two mating contacts are abutted under axial compression force, the fibers therein will not engage each other but will be slightly spaced apart. Since the alignment rods are formed of plastic, the rods experience axial creepage due to the axial compression force applied to the contacts to maintain them in mating engagement. The creepage of the rods causes the fibers mounted therebetween to be exposed at their ends with the result that the fibers in the mating contacts eventually touch each other, causing chipping at their end faces, which produces a loss in light transmission. Also, frequently the fibers will buckle and crack under the axial compressive loads produced.

Another prior art approach to the single fiber connector problem is described in the copending U.S. patent application of G. R. Deacon entitled, "Single Optical Fiber Connector Utilizing Spherical Alignment Elements", Ser. No. 780,259, filed Mar. 23, 1977, now U.S. Pat. No. 4,087,155 and also assigned to the assignee of the present application. In that invention, a set of equal diameter spheres arranged in closely adjacent but not necessarily engaging relationship, defining an interstitial space therebetween, are used. The centers of the spheres lie in a common plane normal to the axial length of the optical fiber. The spheres are dimensioned, to a close tolerance, to closely confine the fiber in the interstitial space. The spheres of one of a pair of mating contacts are abutted under an axial compression force against those of the other contact so that the sphere sets nest with respect to each other, whereby the optical fiber in the space of one such contact is brought into close lateral alignment with that of the mating contact. That particular arrangement is of direct interest in respect to the invention. It has been found that insertion of the optical fibers in the contacts is difficult, however, and tolerances, including the optical fiber diameter tolerance, often result in excessively loose or excessively tight fits.

The manner in which the invention deals with the prior art disadvantages, especially in respect to the disadvantages of the aforementioned invention described in U.S. patent application, Ser. No. 780,259, will be pointed out as this description proceeds.

SUMMARY OF THE INVENTION

In accordance with the hereinbefore outlined state of the prior art in single optical fiber connectors, it may be said to have been the general objective of the present invention to provide an improved connector arrangement effecting a very high order of lateral alignment accuracy at the interface of the optical fibers to be connected. At the same time, it was desired to provide a structure for such connectors which permitted relatively easy optical fiber insertion and which was self-adjusting to accommodate diameter tolerances encountered in typical commercially available single fiber optical cables.

The basic concept of the present invention involves employment of a plurality (preferably three) of alignment spheres in each contact as contemplated in the aforementioned U.S. patent application Ser. No. 780,259, filed Mar. 23, 1977, with the addition of a novel containment sleeve spring-loaded to exert a resilient force acting rearward at its outward aperture to tend to contain and consolidate the spheres of each contact with rearward force against the inwardmost support barrel end. That force is resolved into rearward and radially inward forces.

This support barrel is retained in place in the inner bore within each of the contact subassemblies of the connector, the optical fiber passing through a concentric axial bore within each of these support barrels to the innermost end (interface plane) thereof. Like the configuration described in Ser. No. 780,259, the three-sphere configuration acts as a bearing jewel gripping the optical fibers corresponding to each of the contact subassemblies in a three-point contact (for the preferred three-sphere configuration).

Resilient means (compression spring in the preferred embodiment) urges the containment sleeve rearward by applying its resilient force between the support barrel and the containment sleeve.

At the inward aperture of the aforementioned containment sleeve, a radially, inwardly-directed lip reduces the aperture diameter of the containment sleeve slightly at this end, this reduction being sufficient to prevent the loss of the spheres in the absence of an optical fiber in the interstitial space at the geometric center of the sphere configuration and, also, produces a radially inward sphere-compacting force as the aforementioned inwardly directed lip tends to ride on the surfaces of the spheres in a manner not unlike a cam action. Accordingly, the said interstitial space is automatically adjusted to accommodate the actual outer diameter of the optical fiber used without interfering with the nesting action of the spheres of a pair of mated contacts, producing the desired light-transmitting relationship between abutting optical fibers and also preserving the lateral alignment capability defined in the aforementioned Ser. No. 780,259.

Manual applied force overcoming the spring force operative between the support barrel end and containment sleeve, as aforementioned, allows the spheres of the corresponding contact to assume relatively loose positions within the unrestricted bore portion inward from the lip of the containment sleeve, thereby facilitating optical fiber installation and removal.

The details of a representative embodiment in accordance with the present invention will be presented as this description proceeds.

DETAILED DESCRIPTION

Figure 1:
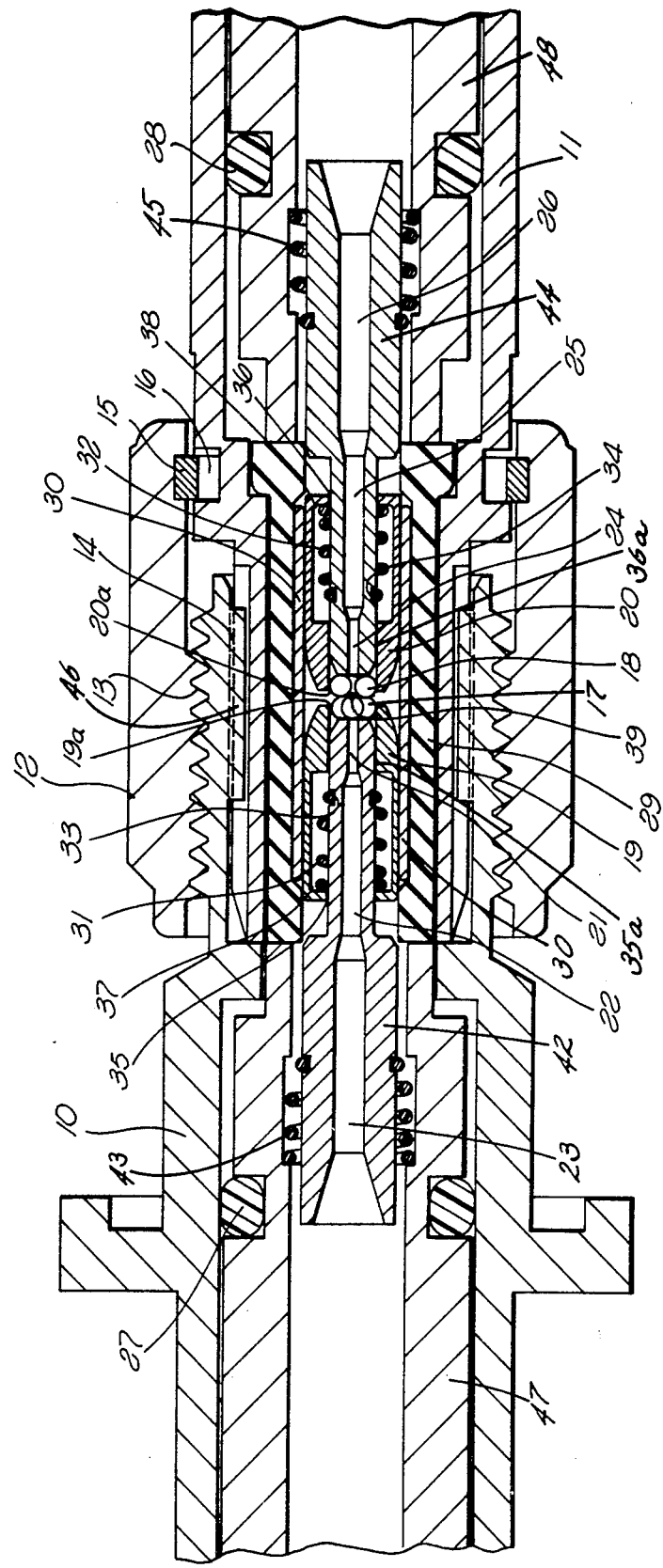
FIG. 1 depicts a pair of contacts according to the invention substantially fully mated in a connector configuration in a section view obtained in accordance with a sectioning plane containing the axial center line of the connector assembly.

Referring now to FIG. 1, the two sets of nested spheres are depicted more or less at the axial and lateral center of the view, 17 being a typical sphere of the sphere set for the left contact member and 18 being a typical sphere for the right hand contact of the connector assembly. It will be seen that the spheres of the left contact have their centers all in a common plane, normal to the axial dimension of the assembly. Similarly, the spheres of the right contact have their centers in another plane parallel to the first-mentioned plane. The optical fiber is not illustrated in FIG. 1. However, its placement with respect to the respective spheres is evident from FIG. 2, the fibers 40 and 41 corresponding to the left and the right contacts, respectively, as illustrated.

It will be noted that the left contact subassembly comprises a body or housing 10 and the right contact subassembly comprises a similar body 11. It is presumed that the connector overall assembly is intended for the connection of only one pair of single optical fibers; however, it will be evident that the present invention is in no way limited to such an arrangement. Actually, there could be a number of left and corresponding right contact subassemblies inserted into suitable bores or cavities in a larger body block corresponding to the right and left-hand contact subassemblies.

In the left contact subassembly depicted in FIG. 1, a support barrel 42 has three concentric tandem bore sections 21, 22 and 23. The bore 23 has an enlarged frusto-conical aperture to facilitate insertion of the fiber optic cable therein, and the transitions to each of 22 and 21 include an additional frusto-conical section providing smooth transition from the largest of these diameters at 23 through the intermediate diameter section 22 to the smallest diameter 21. The bore 21 need be only as large as necessary to accommodate the nominal diameter of the optical fiber for which it is designed, with some allowance for tolerances, of course. The right contact subassembly includes the same bores 24, 25 and 26 with essentially the same transition sections, and in fact, support barrel 42 may advantageously be the identical part used at 44. When the housings 10 and 11 are axially joined by means of a coupling nut 12 having internal threads engaging the external threads of 10 along 13, the entire assembly is in the mated condition. A flat "C washer" or ring fits into an annular internal ring in 12 at 15 and engages a circumferential groove 16, making the coupling nut 12 loosely captive on the body 11.

It will be noted that the innermost part of the body 11 slipfits into the mating bore of 10, the latter being thereby appropriately referred to as a socket member. A keying arrangement 46 is provided for discrete rotational keying (positioning) of 11 in 7 to 10 in the mating operation. The degree of tolerance or freedom of fit of 11 into the socket bore of 10 is indicated by the two dashed lines at 14. A particularly close fit at 14 is not necessary, since the alignment of the fibers is basically determined by the nesting of the spheres associated with each contact subassembly as will be more fully explained hereinafter. Suffice it to say at this point that the fit along 14 is not determinative of the quality of the optical fiber alignment achieved in the connector assembly.

The support barrels 42 and 44 are held within splityoke parts 47 and 48, respectively, and are headed by circular rings or containment sleeves 19 and 20. Compression springs 43 and 45 operate to position and retain support barrels 42 and 44 as indicated. O-rings seals 27 and 28 surround the barrels 42 and 44, respectively.

A tubular grommet 29 of resilient material such as silicone rubber fits within the leftmost extreme of body 11 and holds an alignment sleeve 30 in place, as shown. It may also be said that the alignment sleeve 30 holds the flexible walls of 29 in place over its own length.

As the part 11 is inserted within the socket end of 10, support barrel 42 headed by containment sleeve 19 enters alignment sleeve 30 and proceeds until the spheres associated with the left contact member and the right contact member are nested in much the same manner as described in U.S. patent application Ser. No. 780,259. However, it will be noted that each of the containment sleeves is resiliently anchored to its corresponding support barrel; i.e., by a spring 31 engaging support barrel 42 at 33 at one end and the rear inwardfacing wall of 19 at 37 on the other spring end. This speing exerts a force tending to urge 19 to the left, as illustrated, in which case the inwardly directed lip 19a rides against a point of each of the spheres corresponding to the left contact so that they are urged radially inward as well as being compressed against the nose of 42. The same pertains to the right contact subassembly; i.e., the containment sleeve 20 with inwardly directed lip 20a exerts the same forces on the right optical fiber, passing through 24, in view of the action of spring 32 effective between the groove 34 in sleeve 20 and the rear inward wall 38 of the sleeve. Sliding fits at 35, 35a, 36 and 36a provide for manual application of axial force tending to further compress springs 31 and 32. That procedure releases the rearward and radially inward sphere consolidation forces, thereby facilitating insertion of an optical fiber passing through bores 21 on the left and 24 on the right.

Figure 3:
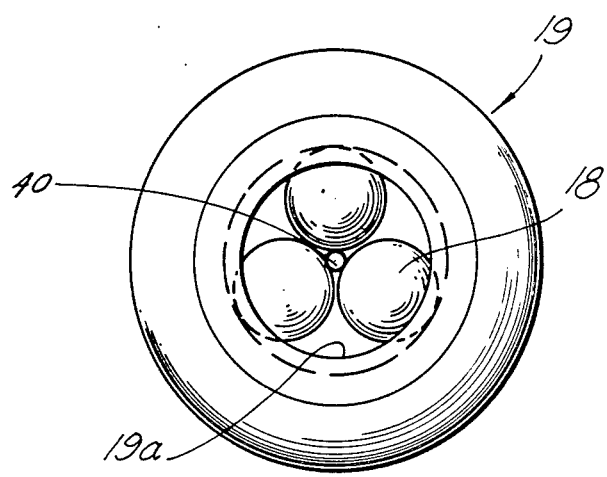
FIG. 3 is an inward end view of the left contact of FIGS. 1 or 2.

Referring now to FIG. 3, the end of the contact 19 is depicted showing the arrangement of the spheres, vis-avis, the optical fiber in the situation of FIG. 1. It will be noted that the diameters of the spheres and the fibers are selected such that each of the spheres touches the inner wall of 19 and the optical fiber, but no one of the spheres touches any other of the spheres, when the spheres are nested with the spheres 18 of the opposite contact 20 in the fully mated condition of the connector. Thus, it will be evident that each sphere of each contact subassembly is in contact with a pair of spheres of the opposite contact subassembly.

Without the optical fiber in place, the spheres are relatively loose within the containment sleeves 19 and 20, in which case, they may be in a random-contact position, assuming that the connector contacts are not mated at the time. The radially inward extent of the lips 19a and 20a is sufficient, however, to prevent the spheres from falling out of the end of 19 or 20 in the unmated condition, even without the optical fiber in place.

The exact point of the tangency of 19a or 20a on the corresponding sphere set will vary according to diameter variations of the optic fiber 40 or 41. A nose-to-nose gap between 19 and 20 in the fully mated condition, as depicted in FIG. 1, assures that these parts will not physically abut to thwart the sphere nesting under any condition within the design limits. However, the nesting of opposite sphere sets is automatically self-adjusting, these acting much as bearing jewels might act.

For the spheres, of which 17 and 18 are typical, hardened steel ball bearings may be advantageously used. These are readily available and are commercially manufactured to very close tolerances. Accordingly, the nesting of opposite sphere sets very effectively controls the lateral alignment of the opposing and abutting optical fibers between which it is desired to establish a light-transmissive relationship with minimum loss.

Of course, the spheres might also be manufactured in hard plastic, glass, or like material. However, bearing balls of bearing grade steel are clearly preferred.

Figure 2:
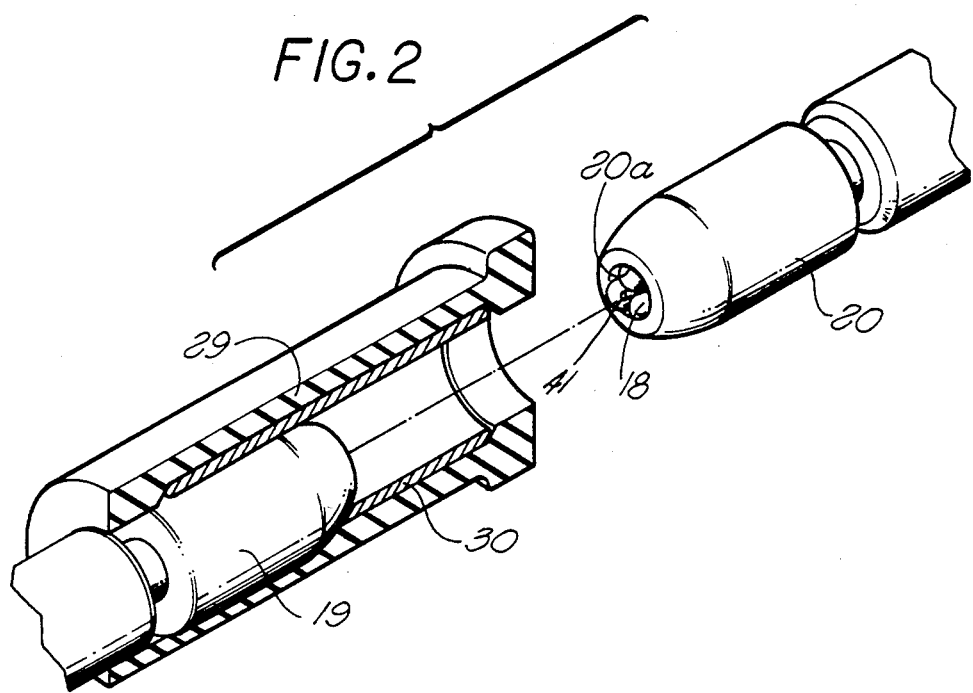
FIG. 2 is a pictorial showing two contacts ready for mating according to FIG. 1, omitting only the coupling nut of FIG. 1 for clarity.

FIG. 2 is largely self-explanatory and is presented to provide a clear understanding of the connector overall assembly resulting when the two contact subassemblies are mated.

Except for the tubular grommet 29 and the springs (which may be satisfactorily provided in ordinary grades of spring steel), all other parts of the contact subassemblies may be fabricated from metals such as stainless steel or other commonly used metals for fiber optic connector structures, or even for electrical contact connector structures. Those skilled in this art will recognize the possibility of substituting certain suitable plastics for certain of the parts of the structure, and accordingly, it may be said that there are no critical material requirements extant in the combination.

Various other modifications in the structure disclosed and described will suggest themselves to those skilled in this art, once the principles of the present invention are well understood. Accordingly, it is not intended that the drawings and this description should be considered as defining the scope of the invention, these being intended to be typical and illustrative only.

What is claimed is:

1. A single optical fiber contact comprising:
   a set of spheres of equal diameter arranged in closely adjacent, but not necessarily engaging, relationship defining an interstitial space therebetween, the centers of said spheres lying in a first common plane;
   first means for supporting a single optical fiber so that the end portion thereof lies in said interstitial space, said spheres being dimensioned to each engage said optical fiber in said space;
   and second means urging said spheres inwardly toward the center of said space.

2. A single optical fiber contact according to claim 1 wherein said second means is releasable whereby said space may be enlarged to facilitate insertion of a single optical fiber therein.

3. A single optical fiber contact as set forth in claim 1 in which said second means includes a circular ring arranged to embrace said set of spheres, the central axis of said ring being perpendicular to said first common plane.

4. A single optical fiber contact according to claim 3 in which the forwardmost surfaces of said spheres lie in a second common plane parallel to said first common plane, and said ring embodies a forward, inwardly extending lip restraining said spheres from forward and radially outward movements relative to said ring, said lip terminating behind said second common plane.

5. A single optical fiber contact as set forth in claim 3, wherein said ring is mounted on said supporting means.

6. A single optical fiber contact according to claim 5 in which said ring is axially movable on said supporting means.

7. A single optical fiber contact according to claim 1 in which an optical fiber is mounted in said space and said spheres and said fiber are dimensioned so that each of said spheres engages said fiber.

8. A single optical fiber contact according to claim 1 further comprising an optical fiber mounted in said space, and in which said spheres and said fiber are dimensioned such that each sphere engages said fiber but no one of spheres engages any other of said spheres other than when said contact is mated with a second contact with the respective sets of spheres corresponding to said contact and said second contact nested relative to each other.

9. A single optical fiber contact according to claim 1 in which said set of spheres is further defined as comprising three of said spheres, said interstitial space thereby having a generally tricuspid configuration.

10. A single optical fiber contact according to claim 1 in which said fiber supporting means comprises an elongated body having forward and rear ends; a bore extending from said rear end of said body to said forward end, said bore being dimensioned to receive a single optical fiber therein; in which said urging means comprises a sleeve axially slidable on said body and spring means biasing said sleeve rearwardly; and in which said sleeve embodies a forward inwardly extending lip restraining said spheres from forward and radially outward movement relative to said sleeve.

11. A single optical fiber contact according to claim 10 in which said sleeve embodies a rear, inwardly extending flange; in which said body has an annular groove therein forward of said flange; and in which said spring means comprises a coil spring inside said sleeve surrounding said body, said spring having a forward convolution disposed in said groove and a rear convolution engaging said flange.

12. A single optical fiber contact comprising:
   an elongated body having a front and a rear;
   a bore in said body extending from said rear to said front, said bore being dimensioned to receive an optical fiber therein;
   three equal diameter spheres in front of said body arranged in closely adjacent relationship defining a tricuspid interstitial space therebetween;
   the centers of said spheres lying in a plane transverse to the center axis of said body;
   said spheres being arranged so that said interstitial space is aligned with said bore;
   and means biasing said spheres inwardly toward the center of said space.

* * * * *